United States Patent [19]

Bonin

[11] 4,129,695
[45] Dec. 12, 1978

[54] PROCESS FOR PREPARING FOAMS FROM POLYISOCYANATES AND POLYEPOXIDES

[75] Inventor: Yves Bonin, Brignais, France

[73] Assignee: Rhone-Poulenc Industries, Paris, France

[21] Appl. No.: 778,258

[22] Filed: Mar. 16, 1977

Related U.S. Application Data

[63] Continuation of Ser. No. 633,613, Nov. 20, 1975, abandoned.

[30] Foreign Application Priority Data

Nov. 20, 1974 [FR] France .................................. 74 38109

[51] Int. Cl.² .................... C08G 18/14; C08G 18/18; C08G 18/22; C08G 18/16
[52] U.S. Cl. .................................... 521/108; 521/121; 521/125; 521/128; 521/129; 521/156; 521/160; 521/902
[58] Field of Search ...................... 260/2.5 BF, 2.5 AB, 260/2.5 AC, 77.5 AB, 77.5 AC

[56] References Cited

U.S. PATENT DOCUMENTS

| | | | |
|---|---|---|---|
| 2,941,966 | 6/1960 | Campbell | 260/2.5 BF |
| 3,020,262 | 2/1962 | Speranza | 260/77.5 R |
| 3,242,103 | 3/1966 | Velzmann | 260/47 A |
| 3,313,747 | 4/1967 | Schramm | 260/75 N |
| 3,673,128 | 6/1972 | Hayash et al. | 260/57 |
| 3,694,406 | 9/1972 | D'Alelio | 260/47 EP |
| 3,929,733 | 12/1975 | Alberino et al. | 260/2.5 BF |
| 3,933,699 | 1/1976 | Kan | 260/2.5 BF |

*Primary Examiner*—H.S. Cockeram
*Attorney, Agent, or Firm*—Bacon & Thomas

[57] ABSTRACT

Polymers comprising polyoxazolidone and carbodiimide recurring units of the formula:

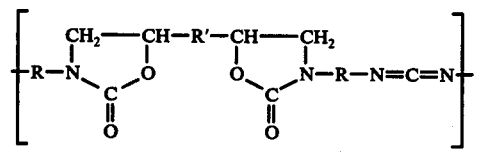

are prepared from polyisocyanates and polyepoxides. Non-friable, low density fire resistant foams are prepared directly from the polymers of the invention without the exquisite addition of pore-forming agents.

18 Claims, No Drawings

PROCESS FOR PREPARING FOAMS FROM POLYISOCYANATES AND POLYEPOXIDES

This is a continuation of application Ser. No. 633,613, filed Nov. 20, 1975, now abandoned.

BACKGROUND OF THE INVENTION

The present invention relates to new polymers prepared from polyisocyanates and polyepoxides and a process for preparing same, as well as to their application in the manufacture of foams having good fire resistance.

It is known to prepare polymers by reacting polyisocyanates and polyepoxides to form polyoxazolidones, the process being carried out in the presence of appropriate catalysts and co-catalysts such as quaternary ammonium halides, tertiary amines, phosphonium halides and aliphatic alcohols as described in U.S. Pat. Nos. 3,020,262, 3,313,747, and 3,694,406. In order to prepare foams from these polyoxazolidones it is necessary to incorporate a pore-forming agent therein as described in U.S. Pat. Nos. 3,242,103 and 3,673,128. To reduce the friability of the foams and increase their fire resistance, it has further been proposed to manufacture same with polyoxazolidones containing isocyanurate chains in the molecule. For example, it has been proposed to prepare oxazolidone-modified isocyanurate resins by trimerizing an isocyanate terminated polyoxazolidone in the presence of a trimerization catalyst as described in U.S. Pat. No. 3,793,236. The foams obtained from such polyisocyanurates are of improved quality but their preparation from epoxide compounds and isocyanates requires the preliminary synthesis of the oxazolidone isocyanate, followed by the polymerization thereof to the isocyanurate. Moreover, the addition of a poreforming agent nevertheless remains necessary.

The entire disclosure of each of the aforementioned U.S. patents is expressly incorporated herein by reference.

SUMMARY OF THE INVENTION

It is, therefore, a primary object of the present invention to provide novel polymers comprised of oxazolidone and carbodiimide recurring units by reaction of polyisocyanates and polyepoxides.

Another object of the invention is to provide nonfriable, low density fire resistant foams derived from the aforesaid polymers.

A further object of the present invention is to provide a process for the preparation of polymer foams which avoids the disadvantages associated with prior art processes.

These and other objects are accomplished by the products and processes of the invention comprising a novel polymer of oxazolidone and carbodiimide recurring units prepared from polyisocyanates and polyepoxides and non-friable foams of good fire resistance obtained directly, in a single step, by the reaction of a diisocyanate or polyisocyanate with a diepoxide or polyepoxide in the presence of a catalyst for the formation of carbodiimide from an isocyanate and a catalyst for the formation of an oxazolidone from an epoxide and an isocyanate in the absence of a pore-forming agent and without any preliminary synthesis of oxazolidone isocyanate and subsequent polymerization of same to the isocyanurate.

Other objects, features and advantages of the present invention will become apparent to those skilled in the art from the detailed description which follows.

DETAILED DESCRIPTION OF THE INVENTION

According to the present invention it has now been found that non-friable low density foams of good fire resistance can be obtained, in a single stage, from polyisocyanates and polyepoxides, in the absence of a pore-forming agent.

The aforementioned foams are derived from novel polymers comprising recurring units of the formula:

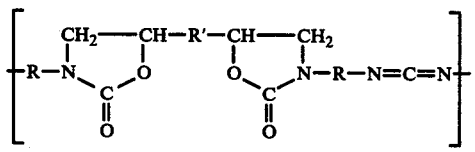

and comprising oxazolidone and carbodiimide recurring chain units and wherein R and R' may be identical or different, and represent a hydrocarbon radical comprising aliphatic, cycloaliphatic or aromatic groups and linear or branched chains thereof and each of R and R' corresponding to the organic residue of an isocyanate and an epoxide. The aliphatic hydrocarbon groups of R and R' may be an alkane, alkene or alkyne monovalent, divalent, or polyvalent radical of $C_1$-$C_8$, such as methyl, ethyl, methylene, propyl, ethylene, n-butyl, pentyl, hexyl, propene, isoprene, n-butene, acetylene, pentyl, and the like as well as isomeric forms thereof. Cycloaliphatic R and R' groups include cycloalkanes and cycloalkenes of $C_3$-$C_8$ such as cyclohexyl, cyclohexylmethyl, cyclopentyl, cyclooctene, etc. Suitable aromatic R and R' groups are comprised of $C_6$-$C_{12}$ aryl, aralkyl and alkaryl, diaryl and the like, including benzyl, phenyl, tolyl, naphthalyl, phenylalkyl wherein alkyl is $C_1$-$C_6$ such as phenylethyl, phenylpropyl, etc., biphenyl, etc. Particularly preferred R and R' groups comprise aromatic radicals of one or more benzene nuclei optionally separated by a divalent alkylene as defined above, a heteroatom or a functional group.

The foams of the present invention are prepared by reacting a diisocyanate or a polyisocyanate with a diepoxide or a polyepoxide in the presence of a catalyst for the formation of a carbodiimide from an isocyanate and a catalyst for the formation of an oxazolidone from an epoxide and an isocyanate.

The reaction by which the carbodiimide chain is formed from an isocyanate under the action of catalysts which will be defined below takes place in accordance with the following equation:

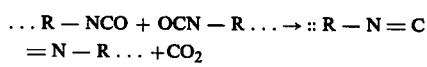

For the formation of an oxazolidone from an isocyanate and epoxide, the equation is as follows:

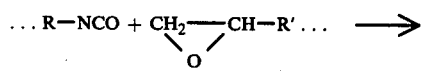

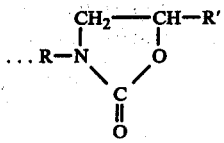

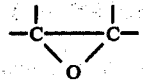

Inasmuch as this latter reaction is exothermic, it initiates the formation of the carbodiimide, which takes place more rapidly, without the necessity of applying additional heat. The carbon dioxide produced during the formation of the carbodiimide causes the expansion of the reaction mixture. Thus it is possible to prepare the foam in a single stage without the application of external energy and without the addition of a swelling or cellularization agent.

To prepare the above carbodiimides and oxazolidones, it is possible to use any diisocyanate or polyisocyanate of aliphatic, cycloaliphatic or aromatic structure, the functionality of which is equal to or greater than 2.

A suitable diisocyanate can be selected from the following exemplary compounds: 1,6-diisocyanato-hexane, tolylene diisocyanates (TDI) such as 2,4-diisocyanato-toluene and 2,6-diisocyanato-toluene, 1,3- and 1,4-diisocyanato-benzene, 2,2-bis-(4-isocyanato-cyclohexyl)propane, bis-(4-isocyanatocyclohexyl)-methane, 1,5-diisocyanato-pentane, 1,4-diisocyanatocyclohexane, bis-(4-isocyanato-phenyl)-methane (MDI), 2,2-bis-(4-isocyanato-phenyl)-propane, 1,5-diisocyanato-naphthalene, 3,3'-dimethyl-4,4'-diisocyanato-biphenyl, bis-(3-methyl-4-isocyanato-phenyl)-methane and 4,4'-diisocyanato-diphenyl ether.

An isocyanate compound having a functionality greater than 2 may be an addition product of diisocyanates with polyols having at least three reactive groups such as glycerol, trimethylolpropane, pentaerythritol and the like. There may also be mentioned 2,4,4'-triisocyanato-diphenyl ether, 4,4', 4"-triisocyanato-triphenylmethane and the polyarylene-polyisocyanates.

It is particularly advantageous to use the polyarylene-polyisocyanates obtained from aniline-formaldehyde condensation products and having the formula:

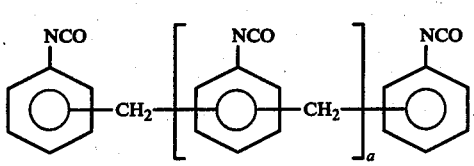

a being a number having an average value between about 0.1 and 2.

The epoxide compounds employed generally contain at least two oxirane rings per molecule and are either aliphatic, cycloaliphatic or aromatic. As diepoxides, there may be mentioned the products resulting from the epoxidation of aliphatic or cycloaliphatic diolefins such as diepoxybutane, diepoxyhexane, vinylcyclohexene dioxide and dicyclopentadiene dioxide. Also suitable are the glycidyl esters of polycarboxylic acid with epichlorohydrin or the dichlorohydrin of glycerol in the presence of an alkali. Such polyglycidyl esters can be derived from aliphatic dicarboxylic acids, for example oxalic acid, succinic acid, glutaric acid, adipic acid, pimelic acid, suberic acid, azelaic acid, sebacic acid or linoleic acid, which may be dimerized or trimerized, and aromatic dicarboxylic acids such as phthalic acid, isophtalic acid, terephthalic acid, 2,6-naphthalene-dicarboxylic acid, 2,2'-diphenyl-dicarboxylic acid, and the bis-(4-carboxyphenyl)-ether of ethylene glycol.

Also suitable are the polyglycidyl ethers obtained by interaction of a divalent or polyvalent alcohol with epichlorohydrin or an analogous substance (for example the dichlorohydrin of glycerol) under alkaline conditions or, as a variant, in the presence of an acid catalyst, with subsequent treatment with an alkali. As alcohols, there may be mentioned diols or polyols such as ethylene glycol, diethylene glycol, triethylene glycol, 1,2-propanediol, 1,3-propanediol, 1,4-butanediol, 1,5-pentane-diol, 1,6-hexanediol, the polyhydroxylic cycloalkanes, 2,4,6-hexanetriol, glycerol or the N-aryl-dialkanolamines such as N-phenyl-diethanolamine. Preferably, glycidyl ethers of diphenols or polyphenols are used, such as resorcinol, pyrocatechol, hydroquinone, 1,4-dihydroxynaphthalene, 1,5-dihydroxynaphthalene, bis-(4-hydroxyphenyl)-methane, 1,1,2,2-tetrahydroxyphenyl-ethane, bis(4-hydroxyphenyl)-methyl-phenyl-methane, the bis-(4-hydroxyphenyl)-tolyl-methanes, 4,4'-dihydroxydiphenyl, bis-4-hydroxyphenyl-sulphone and in particular 2,2-bis-(4-hydroxyphenyl)-propane or the condensation products of a phenol with an aldehyde or a ketone. In the latter case, the materials are epoxy resins containing two or more epoxide groups and, possibly, free hydroxyl groups. Among these, the epoxy resins prepared from polyphenols which are marketed under the name novolac resins and are polycondensation products of a phenol with formaldehyde are particularly suitable. The epoxy resins obtained are represented by the formula:

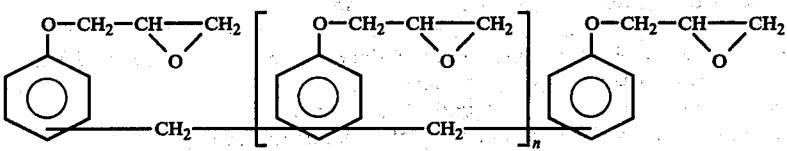

in which n has a value from 0 to 12.

The foregoing may also contain free hydroxyl groups capable of reacting with the isocyanates to form a polyurethane chain.

The amounts of isocyanate and epoxide compounds employed must be such that there is an excess of isocyanate groups relative to epoxide groups; where an epoxy resin containing free hydroxyl groups is used, the excess of isocyanate must be calculated relative to the total of the epoxide and hydroxyl groups since the isocyanates react with the hydroxyl groups to form urethane groups.

The ratio of the number of isocyanate groups to the number of epoxide groups is between 1.1:1 and 20:1 and preferably between 1.2:1 and 10:1. If the epoxy resin contains free hydroxyl groups, it is necessary to employ an additional amount of isocyanate compounds and the polymer obtained contains both carbodiimido-oxazolidone chains and urethane chains.

The catalyst system utilized in the present invention comprises a catalyst for the reaction of the isocyanate with the epoxide to form the oxazolidone (compound A) and a catalyst for the formation of a carbodiimide (compound B). The A compounds are alkaline reagents of various types. Preferentially, there may be mentioned tertiary aliphatic, cycloaliphatic and aromatic amines such as trimethylamine, triethylamine, tributylamine, polyalkylene-polyamines such as permethylated dihexamethylene-triamine, N,N-dimethylaniline, the N,N'-dialkyl-piperazines such as N,N'-dimethylpiperazine, and 1,4-diaza-(2,2,2)-bicyclo-octane (triethylene diamine). The quaternary ammonium halides such as tetraalkylammonium and/or tetraarylammonium bromides and chlorides, may also be utilized as well as the alcoholates of lithium, potassium or sodium. The foregoing are merely representative and it is possible to use any other known agent for bringing about the condensation of an isocyanate group with an epoxide to give an oxazolidone ring. The amount of catalyst employed is from about 0.1 to 10% and preferably 0.5 to 5% of the sum of the weight of the isocyanate compound and the epoxide compound.

The B compounds which are catalysts for the formation of the carbodiimide groups can be phospholine or phospholidines as well as their sulphides and their oxides. The catalytic activity of these compounds is known and in particular, U.S. Pat. Nos. 2,853,518 and 2,853,473 may be referred to.

Among these catalytic compounds, there may be mentioned 1-phenyl-3-phospholine or 1-phenyl-phospholidine, 3-methyl-1-phenyl-3-phospholine or 3-methyl-1-phenyl-phospholidine and more generally the alkyl-substituted phospholines and phospholidines as well as their oxides. It is also possible to use other products such as, for example, the 2,4,6-trisdialkanolamine-triazines, the catalytic activity of which in the formation of carbodiimides is known from U.S. Pat. No. 3,645,923. The amount of catalyst can vary between about 0.01 and 10% of the weight of the isocyanate compound, and preferably between 1 and 5%.

The catalytic compounds A and B are added directly to the mixture of the isocyanate compound and the epoxide compound or in the form of a solution in a suitable solvent such as, for example, ethylene glycol, diethylene glycol, dipropylene glycol, dimethylsulfoxide, dimethyl-formamide, dimethylacetamide or hexamethylphosphotriamide.

For the preparation of the foams, various adjuvants including surfactants, which facilitate the formation of regular cells, can be used. Thus, the products based on silicones, for example the copolymers of polyols and silanols, such as the condensation products of polyoxyethylene glycols or of polyoxypropylene glycols with disilanols or trisilanols can be employed. It is also possible to add, during the preparation of the mixture, a pore-forming swelling agent such as a volatile hydrocarbon, for example butane or pentane, or halogenated hydrocarbons such as trifluorochloromethane, dichlorodifluoromethane and the chlorofluoroethanes. A small amount of water, which liberates carbon dioxide by reacting with the isocyanate groups can also be added for the same purpose. As indicated previously, one of the advantages of the present process is that a pore-forming agent can be dispensed with if a large excess of diisocyanate or polyisocyanate, relative to the epoxide, is reacted, because the amount of carbon dioxide produced by the reaction is sufficient to ensure the formation of the foam. However, if it is desired to obtain a lighter foam or more rapid expansion, the addition of a swelling agent can be advantageous.

In specific applications, it may be desirable to include other additives in the foams of the invention. Thus, various dispersing agents, cell stabilizers, flame retardants and the like conventionally utilized may be employed herein.

The polymers and foams of the present invention displaying valuable properties including non-friability, low density, fire resistance and low flame spread can advantageously be utilized as building materials, for example, thermal barriers or shields and insulation, as well as coatings, adhesives and the like.

The present invention will be further illustrated by reference to specific examples thereof which are not intended to be limiting in any manner.

In the examples, the preparation of foams was carried out in an apparatus which will be referred to as an expansometer and which makes it possible to determine the foaming pressure during expansion and the height of the foam.

The expansometer apparatus essentially comprises a cylinder with a vertical axis, in which the foam forms, and wherein the pressure developed by the foam against the flexible lower wall of the cylinder, which is connected to a pressure recorder, is constantly measured. The maximum pressure which is reached (MP), expressed in $g/cm^2$, is thus known. The time required to reach the gel point (GT) is also recorded; this corresponds to the time which elapses between the addition of the catalyst system to the mixture of reactants and the moment at which the pressure increases abruptly. The maximum temperature ($\theta$), expressed in degrees centigrade, reached in the course of foaming is measured by a thermocouple.

The inflammability of the foams was measured by determining the oxygen index (OI) by means of a model MKM-JD 14 apparatus, in accordance with the test described in Journal of Fire and Flammability 2, pages 260–69, October 1971.

EXAMPLE 1

183.3 grams of a polyisocyanate obtained by phosgenation of an aniline-formaldehyde resin (MDI) and containing 0.725 NCO group per 100 grams, and 20 grams of an epoxy resin called EPON 812, which is a resin derived from a polyol and having an epoxide equivalent of 150–170 (this equivalent being the weight of resin, in grams, which corresponds to one epoxy group) are introduced into a 700 $cm^3$ beaker. Thereafter 2.5g of a surface-active agent consisting of a silicone-glycol copolymer of low viscosity are added and the mixture is then homogenized by stirring. 6 g of a 33% strength solution of triethylene-diamine (or DABCO) in dipropylene glycol (compound A) and 12 g of a 50% strength solution of 1-phenyl-3-methyl-1-phospholine oxide in hexamethylphosphoramide (compound B) are then poured in, while continuing the stirring. Thereafter the mixture obtained is rapidly poured into the expansometer; the gradual but rigid formation of the foam is immediately observed.

and 2,6-diisocyanato-toluene in the ratio of 80-20 (TDI). The following results are obtained:

| Example | Epon 812 | TDI | Compound A | Compound B | GT | MP | θ | d | OI |
|---|---|---|---|---|---|---|---|---|---|
| 2 | 20 g | 112 g | 2 g | 12 g | 1'38" | 24 | 108 | 0.0142 | 23.5 |
| 3 | " | 154 g(1) | 6 g | 12 g | 58" | 161 | 105 | 0.0253 | 23.8 |

(1)the crude product resulting from the phosgenation of diaminotoluenes was used.

The following values are obtained for the foregoing operation:
GT: 2 minutes 10 seconds
θ: 110° C.
MP: 172 g/cm$^2$ A rigid foam of density (d) 0.029 is removed from the apparatus. The pores are fine and are uniformly distributed throughout the mass. Examination on an IR 7 Beckmann infra-red spectrophotometer shows the characteristic bands of carbodiimides at 2,140 cm$^{-1}$ and of carbonyl-oxazolidone at 1,715 cm$^{-1}$. In contact with a flame, charring but no ignition occurs. The oxygen index measured 24 hours after the formation of the foam has a value of 26.

EXAMPLES 2-3

The same reactants as those of the preceding example were used, except the polyisocyanate is a mixture of 2,4-

EXAMPLES 4-8

These were carried out with the polyisocyanate of Example 1 and an epoxy resin marketed under the name of DEN 431, which is a glycidyl polyether of a NOVOLAC resin, of epoxide number 180. In some of the examples, the pore-forming activity of the $CO_2$ evolved was assisted by the addition of trifluorochloromethane or F-11.

| Example | DEN 431 (g.) | MDI (g.) | F-11 (g.) | Compound A | Compound B | GT | MP | θ | d | OI |
|---|---|---|---|---|---|---|---|---|---|---|
| 4 | 100 | 94.5 | 25 | 6 g | 6 g | 24" | 141 | 145 | 0.0387 | 23.5 |
| 5 | 82.7 | 138.1 | 15 | 4 g | 12 g | 51" | 178 | 105 | 0.0359 | 24.2 |
| 6 | 60 | 214.4 | 0 | 4(1) | 12 g | 1'09" | >350 | 125 | 0.0440 | 25.5 |
| 7 | 20 | 180.6 | 0 | 4(1) | 12 g | 1'50" | 116 | 98 | 0.029 | 26.3 |
| 8 | 14.4 | 193.4 | 0 | 6 g | 6 g | 3'26" | 106 | 114 | 0.0325 | 26.7 |

(1)a 33% strength solution of DABCO in ethylene glycol. In the other examples, the solutions of DABCO and of 1-phenyl-3-methyl-1-phospholine oxide are identical to those of Example 1.

Examples 9-13

| Example | Epon 812 | MDI (g.) | Compound A | Compound B | GT | MP | θ | d | OI |
|---|---|---|---|---|---|---|---|---|---|
| 9 | 20 g | 183.3 | Et3N(1) | 12 g(2) | 12' | 28 | 49 | 0.0216 | 23.7 |
| 10 | 20 g | 183.3 | Dimethyl-piperazine(3) | 12 g | 11' | 49 | 56 | 0.0214 | 23.6 |
| 11 | 20 g | 186.9 | BHMTA(4) | 12 g | 4'21" | 107 | 89 | 0.022 | 24.7 |
| 12 | 20 g | 181.6 | DABCO(5) | 12 g | 1' | 237 | 138 | 0.040 | 26.4 |
| 13 | 20 g | 195.6 | DABCO(6) | 19 g(7) | 58" | >350 | 144 | 0.052 | 27.6 |

(1)3.5 g of triethylamine in 4 g of dipropylene glycol.
(2)6 g of methylphenylphospholine oxide in 6 g of HMPT.
(3)8 g of N,N-dimethylpiperazine in 4 g of dipropylene glycol.
(4)6.7 g of permethylated bis-hexamethylenetriamine in 2.67 g of ethylene glycol; this amine was prepared by methylation of bis-hexamethylenetriamine by the action of formaldehyde in the presence of acetic acid.
(5)3 g of DABCO + 6 g of dipropylene glycol.
(6)2 g of DABCO in 10 g of dipropylene glycol.
(7)3 g of methyl-phenyl-phospholine oxide in 16 g of HMPT

Examples 14-16
These examples illustrate the addition of a flame-proofing agent to the mixture of the reactants

| Example | Epon 812 | MDI | Compound A | Compound B | Flame-proofing agent | GT | MP | θ | d | OI |
|---|---|---|---|---|---|---|---|---|---|---|
| 14 | 20 g | 183.3 | 6 g | 12 g | 20 g of TCEP(1) | 2'42" | 114 | 103 | 0.026 | 27.1 |
| 15 | 20 g | 183.3 | 6 g | 12 g | 2 g of red phosphorus | 2'12" | 135 | 97 | 0.029 | 26.8 |
| 16 | 20 g of DBN 431 | 186.5 | 6 g(2) | 10 g(3) | 20 g of TCEP | 1' | 328 | 134 | 0.043 | 29.1 |

(1)Tris-(2-chloroethyl) phosphate
(2)2 g of DABCO + 4 g of ethylene glycol
(3)Represents 4 g of phospholine oxide in 6 g of hexamethylphosphoramide.
Apart from these exceptions, the solutions of DABCO and of phospholines employed are the same of those of Example 1.

It can be seen from these various examples that the gelling of the resins is rapid without it being necessary to apply heat and that the foams have a low density and good fire resistance.

While the invention has been shown and described by reference to preferred embodiments thereof, it is to be expressly understood that various changes, modifications and/or substitutions may be made therein without departing from the spirit and scope thereof, it being the intention that the invention be limited only by the scope of the appended claims.

What is claimed is:

1. A cellular polymer comprised of recurring dioxazolidone units of the formula (I) and recurring carbodiimide units of the formula (II):

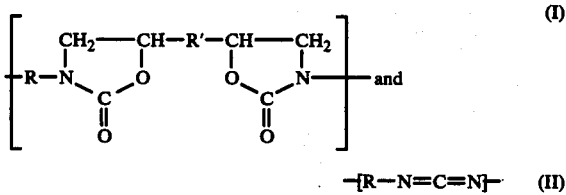

wherein R and R' may be the same or different and each represents a hydrocarbon selected from the group consisting of aliphatic, cycloaliphatic and aromatic groups and linear or branched chains thereof, wherein the ratio between the number of recurring dioxazolidone units of formula (I) and the number of recurring carbodiimide units of formula (II) is from about 0.5:0.05 to about 0.5:9.5, and characterized by carbodiimide bands at 2,140 cm$^{-1}$ and carbonyl-oxazolidone bands at 1,715 cm$^{-1}$ upon infra-red spectro photographic analysis.

2. The polymer of claim 1, wherein said R and R' groups are independently selected from alkane, alkene or alkyne monovalent, divalent or polyvalent radicals of $C_1$–$C_8$, cycloalkanes and cycloalkenes of $C_3$–$C_8$, aryl of $C_6$–$C_{12}$, diaryl or aralkyl or alkaryl wherein the alkyl thereof is $C_1$–$C_6$.

3. The polymer of claim 1, wherein said R and R' comprise an aromatic radical of one or more benzene nuclei and optionally separated by a divalent alkylene radical, a heteroatom or a functional group.

4. A non-friable, low-density fire resistant foam comprised of the polymer of claim 1.

5. The foam of claim 4, wherein said foam has a density (d) ranging between 0.010 and 0.055 and an oxygen index ranging between 23 and 28.

6. The polymer of claim 1, wherein R comprises a phenylene radical optionally substituted by an alkylene radical and R' comprises a radical of the formula:

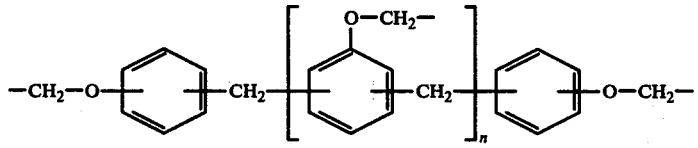

wherein n varies from 0 to 12.

7. The polymer of claim 1, wherein R comprises a radical of the formula

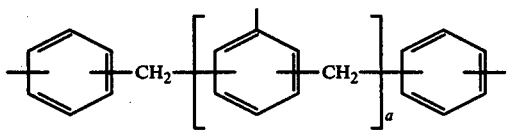

wherein a varies between about 0 to 2.

8. A process for the preparation of cellular polymers comprised of recurring dioxazolidone units and carbodiimide units as defined in claim 1, comprising reacting a diisocyanate or polyisocyanate with such an amount of a diepoxide or a polyepoxide that the ratio between the number of isocyanate groups and the number of epoxide groups is between about 1.1:1 and about 20:1, in the presence of a catalytic amount of from about 0.1 to about 10%, by weight, relative to the total weight of the isocyanates and epoxides of a first compound capable of forming a carbodiimide from an isocyanate and a catalytic amount of from about 0.01 to about 10%, by weight, relative to the total weight of the isocyanates and epoxides of a second compound capable of forming an oxazolidone from an epoxide and an isocyanate.

9. The process of claim 8, wherein said diisocyanate or polyisocyanate comprises an aliphatic, cycloaliphatic or aromatic isocyanate having a functionality equal to or greater than 2.

10. The process of claim 9, wherein said diisocyanate or polyisocyanate is selected from the group consisting of 1,6-diisocyanato-hexane, 2,4-diisocyanato-toluene, 2,6-diisocyanato-toluene, 1,3-1,4-diisocyanato-benzene, 2,2-bis-(4-isocyanato-cyclohexyl)-propane, bis-(4-isocyanato-cyclohexyl)-methane, 1,5-diisocyanato-pentane, 1,4-diisocyanato-cyclohexane, bis-(4-isocyanato-phenyl)-methane, 2,2-bis-(4-isocyanato-phenyl)-propane, 1,5-diisocyanato-naphthalene, 3,3'-dimethyl-4,4'-diisocyanato-biphenyl, bis-(3-methyl-4-isocyanato-phenyl)-methane and 4,4'-diisocyanato-diphenyl ether, 2,4,4'-triisocyanatodiphenyl ether, 4,4',4"-triisocyanato-triphenyl methane and a polyarylene-polyisocyanate having the formula:

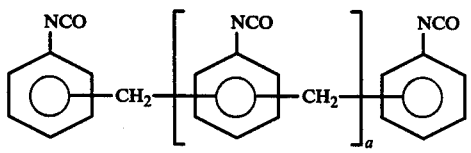

a being a number ranging between 0.1 to 2.

11. The process of claim 8, wherein said diepoxide or polyepoxide comprises the product obtained from the epoxidation of an aliphatic or cycloaliphatic diolefin, glycidyl esters of polycarboxylic acids obtained by the reaction of a polycarboxylic acid with epichlorohydrin or the dichlorohydrin of glycerol or the compound obtained by the reaction of a divalent or polyvalent alcohol with epichlorohydrin and epichlorohydrin adducts of polyhydric phenols.

12. The process of claim 8, wherein said epoxide comprises a polyepoxide obtained by the polycondensation of a phenol or polyphenol with an aldehyde or a ketone.

13. The process of claim 8, wherein said ratio is between 1.2:1 and 10:1.

14. The process of claim 8, wherein an aromatic diisocyanate is reacted with an epoxy resin in the presence of a tertiary amine and a phospholine or phospholidine oxide or sulfide.

15. The process of claim 8, wherein a polyisocyanate obtained by phosgenation of an aniline-formaldehyde resin is reacted with a glycidyl polyether of a phenol-formaldehyde resin in the presence of a tertiary amine and a phospholine oxide.

16. The process of claim 8, wherein said first compound for the formation of a carbodiimide from an isocyanate comprises a phospholine or phospholidine compound or the sulfide or oxides thereof and said second compound for the formation of an oxazolidone from an epoxide and an isocyanate comprises a tertiary aliphatic, cycloaliphatic or aromatic amine, polyalkylene-polyamine, quaternary ammonium halide or alkali metal-alcoholate.

17. The process of claim 16, wherein said first compound comprises a 1-phenyl-3-methyl-1-phospholine oxide introduced into the reaction in a 50% solution of hexamethylphosphoramide and said second compound comprises triethylenediamine introduced into said reaction in a 33% solution thereof in dipropylene glycol.

18. A non-friable, low-density fire resistant foam obtained by the process of claim 8.

* * * * *